US009672629B2

(12) United States Patent
Vink et al.

(10) Patent No.: US 9,672,629 B2
(45) Date of Patent: Jun. 6, 2017

(54) FLUORESCENCE IMAGE PROCESSING APPARATUS AND METHOD

(71) Applicant: KONINKLIJKE PHILIPS N.V., Eindhoven (NL)

(72) Inventors: Jelte Peter Vink, Eindhoven (NL); Marinus Bastiaan Van Leeuwen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/100,773

(22) PCT Filed: Nov. 28, 2014

(86) PCT No.: PCT/EP2014/075931
§ 371 (c)(1),
(2) Date: Jun. 1, 2016

(87) PCT Pub. No.: WO2015/082340
PCT Pub. Date: Jun. 11, 2015

(65) Prior Publication Data
US 2016/0314594 A1    Oct. 27, 2016

(30) Foreign Application Priority Data

Dec. 4, 2013 (EP) .................................. 13195598

(51) Int. Cl.
*G06K 9/00* (2006.01)
*G06T 7/00* (2017.01)
*G06T 5/00* (2006.01)
*G06T 5/20* (2006.01)
*G06T 5/40* (2006.01)
*G06T 7/11* (2017.01)
*G06T 7/194* (2017.01)
*G06T 7/136* (2017.01)

(52) U.S. Cl.
CPC .......... *G06T 7/0081* (2013.01); *G06K 9/0014* (2013.01); *G06T 5/002* (2013.01);
(Continued)

(58) Field of Classification Search
CPC .................... G06T 7/0081; G06T 5/40; G06T 2207/10064; G06T 2207/10056;
(Continued)

(56) References Cited

U.S. PATENT DOCUMENTS 5,790,692 A    8/1998  Price
2002/0186874 A1    12/2002  Price
(Continued)

FOREIGN PATENT DOCUMENTS

DE    19801400 A1    7/1999
JP    2012163777 A    8/2012

OTHER PUBLICATIONS

Gonzalez et al Digital Image Processing: International Edition, 2008.
(Continued)

*Primary Examiner* — Yon Couso

(57) ABSTRACT

A fluorescence image processing apparatus for enhancing a fluorescence image includes an image segmentation unit, a background determination unit a background reduction unit, and an image enhancement unit. The background and the area of interest of a glass slide are first segmented and then this segmentation is used to enhance the contrast between both areas.

15 Claims, 6 Drawing Sheets

(52) U.S. Cl.
CPC ............... *G06T 5/008* (2013.01); *G06T 5/20* (2013.01); *G06T 5/40* (2013.01); *G06T 7/11* (2017.01); *G06T 7/136* (2017.01); *G06T 7/194* (2017.01); *G06T 2207/10056* (2013.01); *G06T 2207/10064* (2013.01); *G06T 2207/30024* (2013.01)

(58) Field of Classification Search
CPC .......... G06T 5/002; G06T 5/008; G06T 5/20; G06T 2207/30024; G06T 7/11; G06T 7/194; G06T 7/136; G06K 9/0014
USPC ........................................................ 382/171
See application file for complete search history.

(56) References Cited

U.S. PATENT DOCUMENTS

| | | |
|---|---|---|
| 2003/0184730 A1 | 10/2003 | Price |
| 2006/0149479 A1 | 7/2006 | Ma |
| 2009/0080729 A1 | 3/2009 | Zhang |
| 2009/0238457 A1* | 9/2009 | Rittscher .............. G06K 9/0014 382/171 |
| 2013/0243289 A1* | 9/2013 | Wang .................... G06T 7/0081 382/131 |

OTHER PUBLICATIONS

Yang, Lei. et al "An Adaptive non-local means Filter for Denoising Live-Cell Images and Improving Particle Detection", Journal of Structural Biology, vol. 172. No. 3, Dec. 2010, pp. 233-243.

Du, Xian et al "Segmentation of Fluorescence Microscopy Cell Images using Unsupervised Mining", The Open Medical Informatics Journal, vol. 4, pp. 41-49, 2010.

Mueller, Jenna et al "Quantitative Segmentation of Fluorescence Microscopy Images of Heterogeneous Tissue: Application to the Detection of Residual Disease in Tumor Margins", PLOS One, vol. 8, Issue 6, Jun. 2013.

Song, Yang et al "Cell Nuclei Segmentation in Fluorescence Microscopy Images Using Inter- and Intra-Region Discriminative Information", 2013.

* cited by examiner

US 9,672,629 B2

FLUORESCENCE IMAGE PROCESSING APPARATUS AND METHOD

CROSS-REFERENCE TO PRIOR APPLICATIONS

This application is the U.S. National Phase application under 35 U.S.C. §371 of International Application No. PCT/EP2014/075931, filed on Nov. 28, 2014, which claims the benefit of European Patent Application No. 13195598.1, filed on Dec. 4, 2013. These applications are hereby incorporated by reference herein.

FIELD OF THE INVENTION

The invention relates to a fluorescence image processing apparatus and method for enhancing a fluorescence image, to a fluorescence imaging system and method, to a fluorescence image processing computer program, and to a fluorescence imaging computer program.

BACKGROUND OF THE INVENTION

In the life sciences, fluorescence microscopy is a powerful tool which allows the specific and sensitive staining of a specimen in order to detect the distribution of proteins or other molecules of interest. As the background remains unstained, a typical fluorescent image is dark with a number of areas illuminated.

By the introduction of digital pathology, assistance using image analysis tools becomes possible. To achieve a high throughput, low scanning and staining times are needed. This trend is also applicable to fluorescence microscopy, which will be applied more and more in the near future. A lower scanning and staining time will result in a significant lower SNR. Although this is still acceptable for image analysis tools, special enhancement is required to achieve a comfortable contrast for the human operator. This is needed as the human operator is (still) responsible.

US2006149479A1 describes a method for enhancing fluorescence images of an object, such as a biological tissue, by selectively eliminating or reducing unwanted fluorescence from fluorophores other than the fluorophore of interest. The method is based on the measurement of the lifetime of fluorophores while preserving information related to the fluorescence intensity of the fluorophore of interest.

There is a need for improved image enhancement techniques when processing fluorescence images.

SUMMARY OF THE INVENTION

It is an object of the present invention to provide a fluorescence image processing apparatus and method for enhancing a fluorescence image, a fluorescence imaging system and method, a fluorescence image processing computer program, and a fluorescence imaging computer program, which feature improved image enhancement techniques for the processing of fluorescence images.

In a first aspect of the invention, there is provided a fluorescence image processing apparatus for enhancing a fluorescence image. The fluorescence image processing apparatus comprises an image segmentation unit adapted to segment the fluorescence image into one or more areas of interest and one or more background areas; a background determination unit adapted to measure a background signal in the fluorescence image; a background reduction unit adapted to reduce the background signal in the one or more background areas, but not in the one or more areas of interest, in response to the measurement of the background signal; and an image enhancement unit adapted to enhance the one or more areas of interest, but not the one or more background areas.

The key idea of the present invention relates to first segmenting a single image (based on a single image), then measuring the background signal based on the segmentation, then suppressing (or reducing) the background signal based on the measured background signal, and finally to enhance the object signal. In order to enhance the objects, it is preferably proposed to use, e.g., the amount of noise in the background. Thus, the invention preferably makes use of the link between measuring the background signal and enhancing the object signal. Note that the order of background measurement and suppression and of enhancing the object signal can be interchanged so that, after image segmentation, the object signal is first enhanced, before the background signal is measured and suppressed. Further, background measurement and suppression can be carried out in parallel to object signal enhancement. The present invention thus proposes to first segment the background and the area of interest of a glass slide and to use this segmentation to enhance the contrast between both. By that, scanning and staining time can be reduced, while after enhancement the image data has still a comfortable contrast for the human operator.

In a preferred embodiment of the invention, the output of the image enhancement unit is used as input for an image analysis algorithm.

In a further preferred embodiment of the invention, the background signal is used to control the image enhancement unit.

In a further preferred embodiment of the invention, the fluorescence image processing apparatus further comprises an input adapted for receiving the fluorescence image; and an output adapted for outputting an enhanced fluorescence image. By providing an input adapted for receiving the fluorescence image, the fluorescence image processing apparatus can be used with common fluorescence microscopes in a straightforward manner without having to modify the microscope. Further, by providing an output adapted for outputting an enhanced fluorescence image, the fluorescence image processing apparatus can be used with common display units, such as monitors or screens, which do not need to be updated to be used with the fluorescence image processing apparatus of the present invention.

In a further preferred embodiment of the invention, the fluorescence image processing apparatus further comprises an image storing unit adapted for storing the fluorescence image. By providing an image storing unit for storing the fluorescence image, the fluorescence image processing apparatus offers the possibility to repeat the contrast enhancement procedure at a later stage. In a similar manner, the fluorescence image processing apparatus offers the possibility to carry out the contrast enhancement for respectively different choices of the image segmentation, of the background determination, of the background suppression, and/or of the object image enhancement.

In a further preferred embodiment of the invention, the fluorescent image stored in the image storing unit may be used as an input signal to the image segmentation unit. Thereby, quality improvement algorithms can be applied to the stored fluorescent image. Likewise, image processing can be applied in an interative manner to further improve the image quality.

In a further preferred embodiment of the invention, the fluorescence image processing apparatus further comprises a background storing unit adapted for storing the measured background signal. By providing a background storing unit adapted for storing the measured background signal, the fluorescence image processing apparatus offers the possibility to test various background subtraction methods for a determined background signal. Preferably, the end results of the various background subtraction methods are compared to each other. Preferably, one background subtraction method is selected based on the outcome of the comparison.

In a further preferred embodiment of the invention, the background signal stored in the background storing unit may be used as an input signal to the background reduction unit. Thereby, quality improvement algorithms can be applied to the stored background signal. Likewise, image processing can be applied in an interative manner to further improve the image quality.

In a further preferred embodiment of the invention, the fluorescence image processing apparatus further comprises a transmit unit for transmitting the enhanced fluorescence image to a display unit. By providing a transmit unit for transmitting the enhanced fluorescence image to a display unit, the fluorescence image processing apparatus can be used with common display units, such as monitors or screens, which do not need to be upgraded to be used with the fluorescence image processing apparatus of the present invention. Preferably, the transmit unit is adapted for transmitting the enhanced fluorescence image in a wireless fashion, such as e.g. over a WLAN network. Preferably, the transmit unit is an antenna. Then, the fluorescence image processing apparatus does not even have to be physically coupled to a display unit. In fact, the fluorescence image processing apparatus may be in another room, in another building, or even in another city than the display unit. This makes it possible for a fluorescence microscopy expert to monitor the fluorescence image processing apparatus from remote and thus enhances the flexibility of the present invention.

In a further preferred embodiment of the invention, the fluorescence image processing apparatus further comprises a receive unit for receiving an acquired fluorescence image from a fluorescence microscope. By providing a receive unit for receiving an acquired fluorescence image from a fluorescence microscope, the fluorescence image processing apparatus can be used with common fluorescence microscopes, which do not need to be upgraded to be used with the fluorescence image processing apparatus of the present invention. Preferably, the receive unit is adapted for receiving the acquired fluorescence image in a wireless fashion, such as e.g. over a WLAN network. Preferably, the receive unit is an antenna. Then, the fluorescence image processing apparatus does not even have to be physically coupled to the fluorescence microscope. In fact, the fluorescence image processing apparatus may be in another room, in another building, or even in another city than the fluorescence microscope. This makes it possible to train the fluorescence image processing apparatus with a specific fluorescence microscope from remote, such as e.g. while the fluorescence image processing apparatus is still in the factory.

In a further preferred embodiment of the invention, the image segmentation unit is adapted to segment the fluorescence image by applying dynamic thresholding and/or by applying a local histogram-based method. In contrast to convential thresholding techniques that use a global threshold for all pixels, adaptive or dynamic thresholding changes the threshold dynamically over the image. By that, the method is less sensitive to local variations (e.g. due to local variation in staining intensity).

In a further preferred embodiment of the invention, the background determination unit is adapted to create a smoothed histogram from the fluorescence image. The smoothed histogram is used to measure the characteristics (e.g., the mean and variance) of the background signal. This smoothed histogram will in general more accurately reflect the underlying variation in the background signal.

In a further preferred embodiment of the invention, the background reduction unit is adapted to reduce the background signal by smoothing the one or more background areas and/or by clipping the one or more background areas. Smoothing the background signal is applied in order to reduce the noise in the background signal. In essence, the high-frequency components of the signal are reduced and/or suppressed, while the low-frequency components are retrained.

In a further preferred embodiment of the invention, the image enhancement unit is adapted to enhance by boosting the one or more areas of interest and/or by peaking the one or more areas of interest. Peaking can be applied in order to make the edges of objects and/or areas of interest clearer and to make the objects and/or areas of interest more distinct from the background signal. Boosting can be applied in order to enhance the contrast of the objects and/or areas of interest.

In a second aspect of the invention, there is provided a fluorescence imaging system comprising a fluorescence microscope adapted for acquiring a fluorescence image; a fluorescence image processing apparatus for enhancing the fluorescence image, wherein the fluorescence image processing apparatus is a fluorescence image processing apparatus according to the first aspect of the invention; and a display unit for displaying the enhanced fluorescence image.

In a third aspect of the invention, there is provided a fluorescence image processing method for enhancing a fluorescence image. The fluorescence image processing method comprises segmenting the fluorescence image into one or more areas of interest and one or more background areas; measuring a background signal in the fluorescence image; reducing the background signal in the one or more background areas, but not in the one or more areas of interest, in response to the measurement of the background signal; and enhancing the one or more areas of interest, but not the one or more background areas.

In a fourth aspect of the invention, there is provided a fluorescence imaging method comprising acquiring a fluorescence image; processing the fluorescence image according to the fluorescence image processing method of the third aspect of the invention; and displaying the enhanced fluorescence image.

In a fifth aspect of the invention, there is provided a fluorescence image processing computer program for enhancing a fluorescence image. The fluorescence image processing computer program comprises program code means for causing a fluorescence image processing apparatus to carry out the steps of the fluorescence image processing method, when the fluorescence image processing computer program is run on a computer controlling the fluorescence image processing apparatus.

In a sixth aspect of the invention, there is provided a fluorescence imaging computer program, the fluorescence imaging computer program comprising program code means for causing a fluorescence imaging system to carry out the steps of the fluorescence imaging method, when the fluorescence imaging computer program is run on a computer controlling the fluorescence imaging system.

It shall be understood that the fluorescence image processing apparatus, the fluorescence imaging system, the fluorescence image processing method the fluorescence imaging method, the fluorescence image processing computer program, and the fluorescence imaging computer program of have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
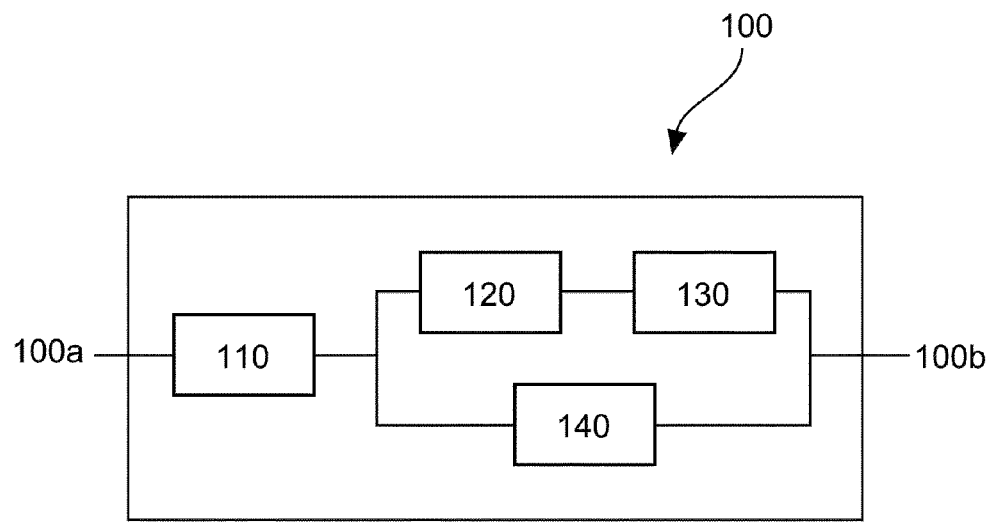
FIG. 1 shows schematically and exemplarily a fluorescence image processing apparatus.

FIG. 1 shows schematically and exemplarily an embodiment of a fluorescence image processing apparatus 100 for enhancing a fluorescence image. Fluorescence image processing apparatus 100 comprises an image segmentation unit 110 adapted to segment the fluorescence image into one or more areas of interest and one or more background areas; a background determination unit 120 adapted to measure a background signal in the fluorescence image; a background reduction unit 130 adapted to reduce the background signal in the one or more background areas, but not in the one or more areas of interest, in response to the measurement of the background signal; and an image enhancement unit 140 adapted to enhance the one or more areas of interest, but not the one or more background areas. Optionally, there could also be a link between background determination unit 120 and image enhancement unit 140. In other words, the amount of noise is measured, and this amount may be used as input parameter to control the enhancement of the objects of interest.

The key idea of the present invention relates to first segmenting a single image (based on a single image), then measuring the background signal based on the segmentation, then suppressing (or reducing) the background signal based on the measured background signal, and finally to enhance the object signal. Note that the order of background measurement and suppression and of enhancing the object signal can be interchanged so that, after image segmentation, the object signal is first enhanced, before the background signal is measured and suppressed. Further, background measurement and suppression can be carried out in parallel to object signal enhancement. The present invention thus proposes to first segment the background and the area of interest of a glass slide and to use this segmentation to enhance the contrast between both. By that, scanning and staining time can be reduced, while after enhancement the image data has still a comfortable contrast for the human operator.

In FIG. 1, fluorescence image processing apparatus 100 further comprises an (optional) input 100a adapted for receiving the fluorescence image and an (optional) output 100b adapted for outputting an enhanced fluorescence image. By providing an input adapted for receiving the fluorescence image, the fluorescence image processing apparatus can be used with common fluorescence microscopes in a straightforward manner without having to modify the microscope. Further, by providing an output adapted for outputting an enhanced fluorescence image, the fluorescence image processing apparatus can be used with common display units, such as monitors or screens, which do not need to be updated to be used with the fluorescence image processing apparatus of the present invention.

Figure 2:
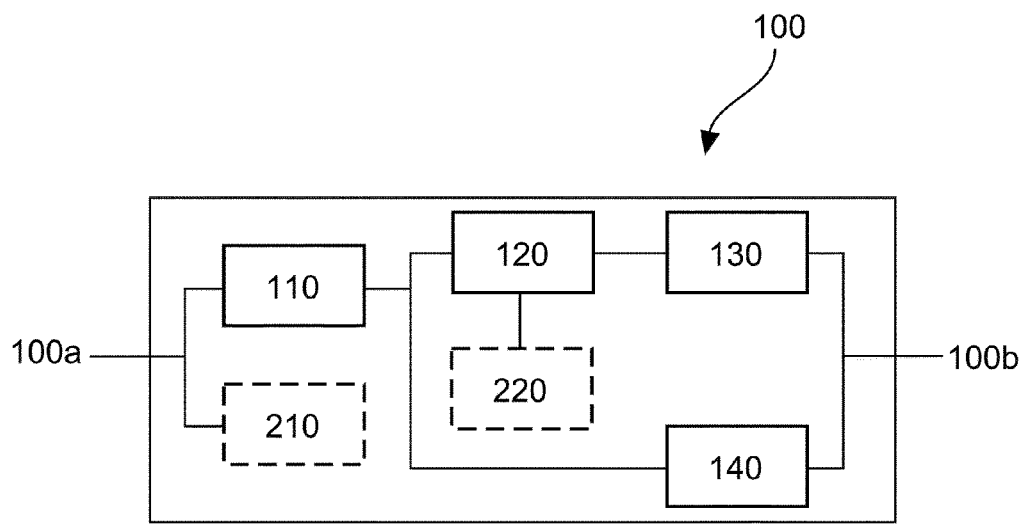
FIG. 2 shows schematically and exemplarily a fluorescence image processing apparatus with optional storing units.

FIG. 2 shows schematically and exemplarily an embodiment of fluorescence image processing apparatus 100 with optional storing units 210, 220. Image storing unit 210 is adapted for storing the fluorescence image. Optionally, in a subsequent processing step, the fluorescent image stored in image storing unit 210 may be used as an input signal to image segmentation unit 110. Thereby, quality improvement algorithms can be applied to the stored fluorescent image. Likewise, image processing can be applied in an interative manner to further improve the image quality. Background storing unit 220 is adapted for storing the measured background signal from background determination unit 120. Optionally, in a subsequent processing step, the background signal stored in background storing unit 220 may be used as an input signal to background reduction unit 130. Thereby, quality improvement algorithms can be applied to the stored background signal. Likewise, image processing can be applied in an interative manner to further improve the image quality.

By providing an image storing unit for storing the fluorescence image, the fluorescence image processing apparatus offers the possibility to repeat the contrast enhancement procedure at a later stage. In a similar manner, the fluorescence image processing apparatus offers the possibility or to carry out the contrast enhancement for respectively different choices of the image segmentation, of the background determination, of the background suppression, and/or of the object image enhancement.

By providing a background storing unit adapted for storing the measured background signal, the fluorescence image processing apparatus offers the possibility to test various background subtraction methods for a determined background signal. Preferably, the end results of the various background subtraction methods are compared to each other. Preferably, one background subtraction method is selected based on the outcome of the comparison.

Figure 3:
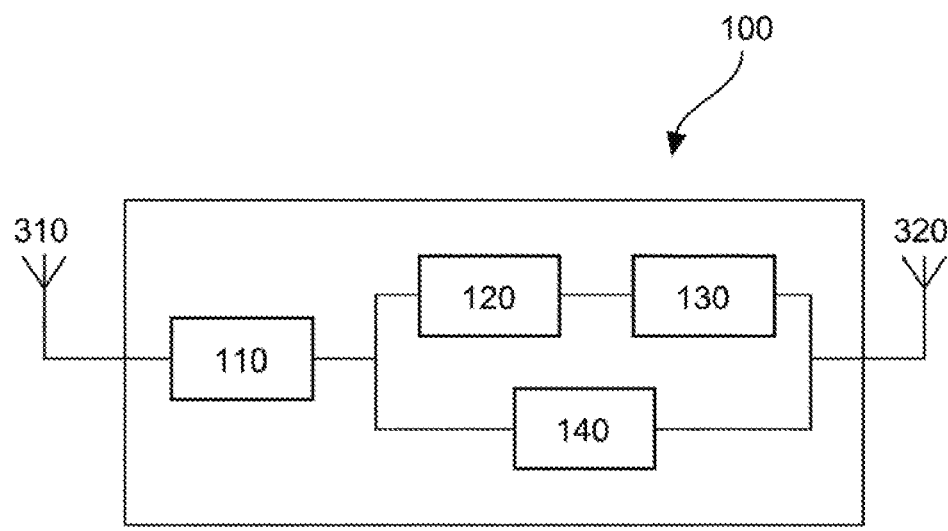
FIG. 3 shows schematically and exemplarily a fluorescence image processing apparatus with optional transmit and receive units.

FIG. 3 shows schematically and exemplarily an embodiment of fluorescence image processing apparatus 100 with optional transmit and receive units 320, 310. Receive unit 310 is adapted for receiving an acquired fluorescence image from a fluorescence microscope. Transmit unit 320 is adapted to transmit the enhanced fluorescence image to a display unit.

By providing a transmit unit for transmitting the enhanced fluorescence image to a display unit, the fluorescence image processing apparatus can be used with common display units, such as monitors or screens, which do not need to be upgraded to be used with the fluorescence image processing apparatus of the present invention. Preferably, the transmit unit is adapted for transmitting the enhanced fluorescence image in a wireless fashion, such as e.g. over a WLAN network. Preferably, the transmit unit is an antenna. Then, the fluorescence image processing apparatus does not even have to be physically coupled to a display unit. In fact, the fluorescence image processing apparatus may be in another room, in another building, or even in another city than the display unit. This makes it possible for a fluorescence microscopy expert to monitor the fluorescence image processing apparatus from remote and thus enhances the flexibility of the present invention.

By providing a receive unit for receiving an acquired fluorescence image from a fluorescence microscope, the fluorescence image processing apparatus can be used with common fluorescence microscopes, which do not need to be upgraded to be used with the fluorescence image processing apparatus of the present invention. Preferably, the receive unit is adapted for receiving the acquired fluorescence image in a wireless fashion, such as e.g. over a WLAN network. Preferably, the receive unit is an antenna. Then, the fluorescence image processing apparatus does not even have to be physically coupled to the fluorescence microscope. In fact, the fluorescence image processing apparatus may be in another room, in another building, or even in another city than the fluorescence microscope. This makes it possible to train the fluorescence image processing apparatus with a specific fluorescence microscope from remote, such as e.g. while the fluorescence image processing apparatus is still in the factory.

Figure 4:
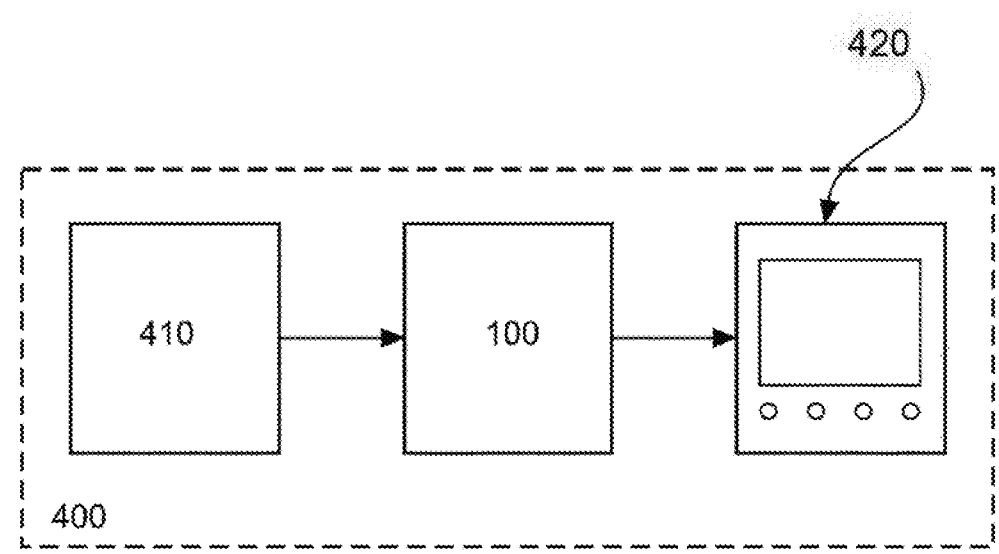
FIG. 4 shows schematically and exemplarily a fluorescence imaging system.

FIG. 4 shows schematically and exemplarily an embodiment of a fluorescence imaging system 400. Fluorescence imaging system 400 comprises a fluorescence microscope 410 adapted for acquiring a fluorescence image; fluorescence image processing apparatus 100 for enhancing the fluorescence image; and a display unit 420 for displaying the enhanced fluorescence image. Note that this approach can also be used as a pre-processing step for an image analysis tool, such as, e.g., a pre-processing step for a FISH (Fluorescence In Situ Hybridization)-analysis.

Figure 5:
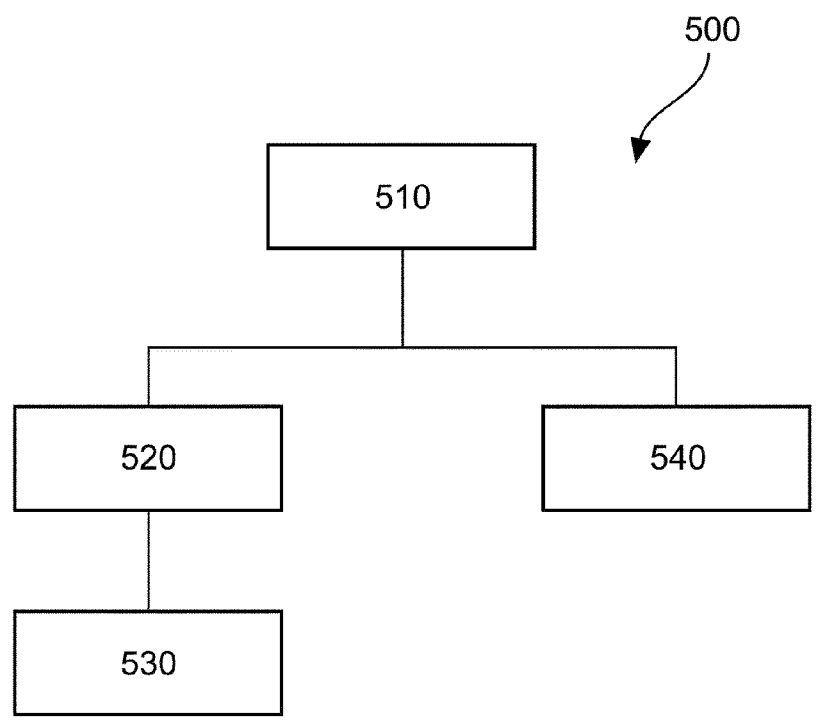
FIG. 5 shows schematically and exemplarily a fluorescence image processing method.

FIG. 5 shows schematically and exemplarily an embodiment of a fluorescence image processing method 500 for enhancing a fluorescence image. Fluorescence image processing method 500 comprises segmenting 510 the fluorescence image into one or more areas of interest and one or more background areas; measuring 520 a background signal in the fluorescence image; reducing 530 the background signal in the one or more background areas, but not in the one or more areas of interest, in response to the measurement of the background signal; and enhancing 540 the one or more areas of interest, but not the one or more background areas.

Figure 6:
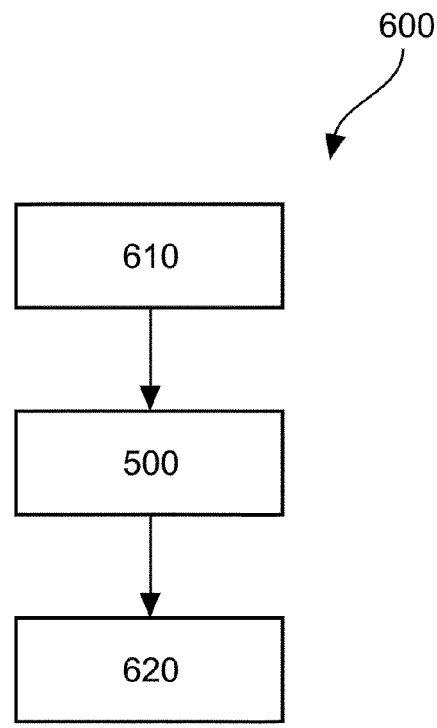
FIG. 6 shows schematically and exemplarily a fluorescence imaging method.

FIG. 6 shows schematically and exemplarily an embodiment of a fluorescence imaging method 600. Fluorescence imaging method 600 comprises acquiring 610 a fluorescence image; processing the fluorescence image according to fluorescence image processing method 500; and displaying 620 the enhanced fluorescence image.

Figure 7:
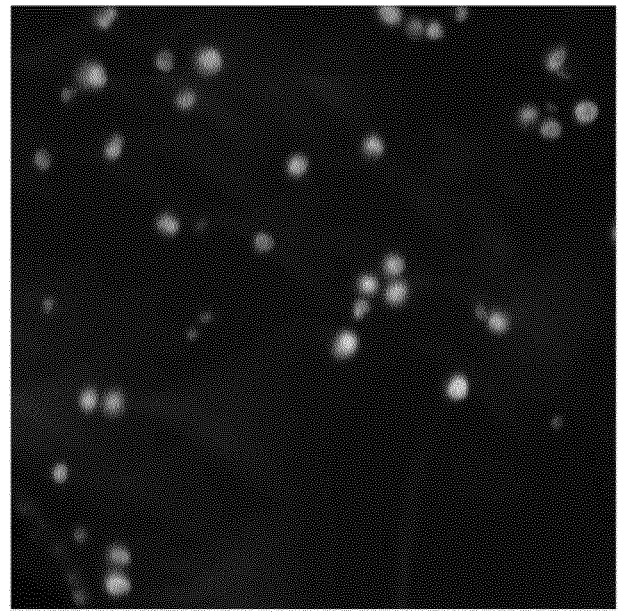
FIG. 7 shows schematically and exemplarily a typical fluorescent image.

A fluorescence microscope is an optical microscope that uses fluorescence and phosphorescence instead of, or in addition to, reflection and absorption to study properties of organic or inorganic substances. The specimen is illuminated with light of a specific wavelength (or wavelengths) which is absorbed by the fluorophores (a fluorescent chemical compound capable of re-emitting light upon light excitation), causing them to emit light of longer wavelengths (i.e., of a different color than the absorbed light). In order for a sample to be suitable for fluorescence microscopy it must be fluorescent. There are several methods of creating a fluorescent sample; the main techniques are labeling with fluorescent stains or, in the case of biological samples, expression of a fluorescent protein. In the life sciences fluorescence microscopy is a powerful tool which allows the specific and sensitive staining of a specimen in order to detect the distribution of proteins or other molecules of interest. As the background remains unstained, a typical fluorescent image is dark with a number of areas illuminated, as shown in FIG. 7.

Currently, the staining process is primarily optimized for visual analysis. The complete process is focusing on the contrast between the background and the area of interest. The signal-to-noise ratio (SNR) should be large enough for quick and fast interpretation by a human operator.

By the introduction of digital pathology, assistance using image analysis tools becomes possible. To achieve a high throughput, low scanning and staining times are needed. A typical scanning time is approximately 60 seconds for one glass slide with a scan area of 15×15 $mm^2$ at a resolution equivalent to a 40× magnification objective and an NA of 0.75. This is the case of conventional (bright field) microscopy. This trend is also applicable to fluorescence microscopy, which will be applied more and more in the near future. A lower scanning and staining time will result in a significant lower SNR. Although this is still acceptable for image analysis tools, special enhancement is required to achieve a comfortable contrast for the human operator. This is needed as the human operator is (still) responsible.

Figure 8:
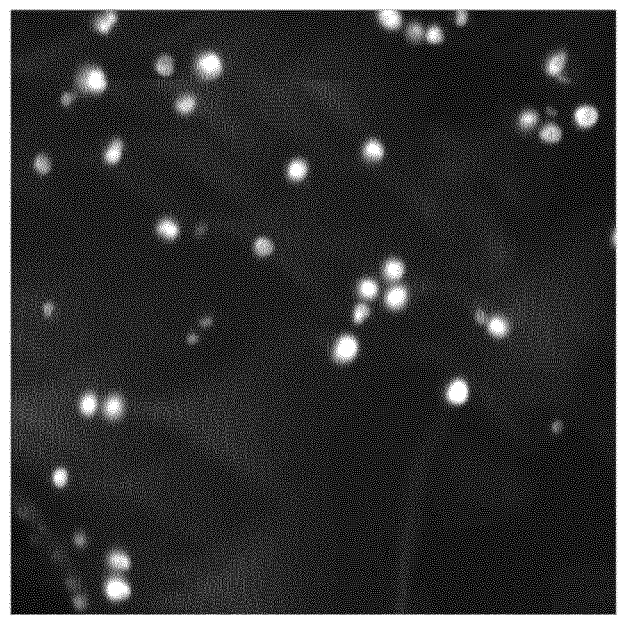
FIG. 8 shows schematically and exemplarily the effect of global enhancement.

The human eye is not very sensitive to small illumination differences in dark areas. Standard (global) image enhancement techniques will not work (as can be seen in FIG. 8), as these techniques do not address the specific content. For a reference describing standard global image enhancement techniques, see e.g., Gonzalez, Woods, *Digital Image Processing: International Edition*, third edition, Pearson, 2008, ISBN-13: 9780132345637. By that, the noise in the background signal will also be enhanced, which should be avoided.

However, by using image analysis, specific areas in the image can be enhanced or reduced. By creating a segmentation map for the area of interest, and by enhancing the area of interest and reducing the background signal, the contrast between the background and the area of interest can be enhanced. Then, the measured SNR can be significantly smaller. By that, smaller staining and scanning times are possible.

Global noise reduction techniques typically apply low-pass filters to the complete image, such that also the areas of interest are smoothed.

Local noise reduction techniques like edge-preserving filtering try to reduce the noise in the signal, while preserving the relevant edges. (For a reference describing edge-preserving filtering, see e.g., section 5.3.3 on adaptive filters in Gonzalez, Woods, *Digital Image Processing: International Edition*, third edition, Pearson, 2008, ISBN-13: 9780132345637.) By that, small differences within the areas of interests (e.g. the fluorescent dots) will also be smoothed. Furthermore, an issue is how to determine the correct threshold to differentiate between the relevant edges (i.e. the borders of the areas of interest) and the edges caused by the noise in the background signal.

The present invention solves this issue by first creating a segmentation. This may apply, e.g., not only looking at the edges but using knowledge about the content to find the areas of interest. Next, the background signal is measured. Next, this measured noise level is used to suppress the background noise as much as possible. Furthermore, the segmented areas of interest are boosted to further increase the contrast level.

Local noise reduction techniques like non-local means (an image de-noising process based on non-local averaging of all the pixels in an image) filter a pixel based on the degree of similarity between a local patch and a set of patches. Again, specific knowledge about the content (e.g. the fluorescent dots) is not used, such that also small differences within the areas of interests will be smoothed.

The following steps are proposed:
1. Background and area of interest segmentation (also possible using machine learning or bilateral filtering)
2. Measuring the background signal
3. Reducing/suppressing the background signal
4. Enhancing the area of interest The order of steps three and four can be interchanged. Further, the border between the area of interest and the background can be determined by several methods. Firstly, a local threshold can be determined, based on the background intensity level. Secondly, region growing can be applied using seeds, generated based on the intensity of the area of interest.

Figure 9:
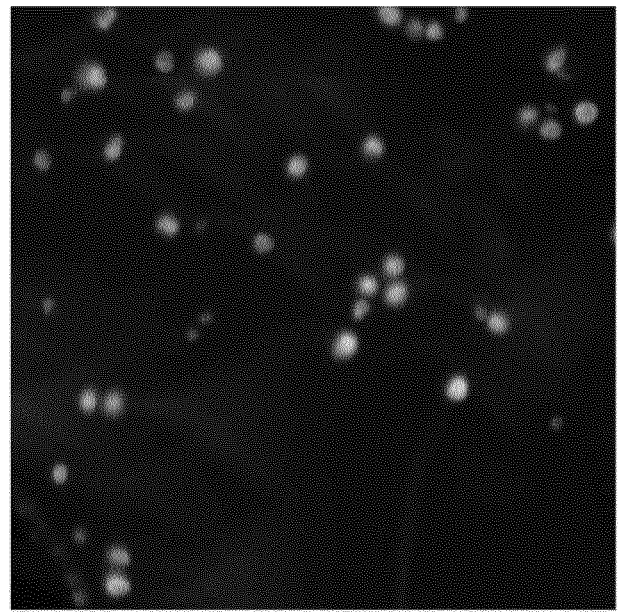
FIG. 9 shows schematically and exemplarily a segmentation map of the fluorescent image of FIG. 7.

In the first step, segmentation between the background and the area of interest is required. Image segmentation relates to partitioning a digital image into a plurality of segments. A technique as dynamic thresholding is applicable, which is robust against local differences in the background signal. Additionally or alternatively, a (local) histogram-based method can be applied. An example of the segmentation is shown in FIG. 9. Dynamic thresholding and (local) histogram-based methods are standard techniques which are known to developers of (digital pathology) image processing applications. In the second step, the background signal is measured. A simple approach is to create a smoothed histogram of the background signal, in order to determine the amount of noise in the background signal. This measure is then used to control the amount of signal reduction in background signal and enhancement of the area of interest.

In the third step, noise reduction techniques (e.g. smoothing, clipping) are applied to the background. As explained herein above, the present invention proposes to apply noise reduction not to the entire image (global noise reduction), but only to "uninteresting" areas (such as, e.g., areas without fluorescent dots). In particular, applying noise reduction to the complete image will also reduce the interesting signal (i.e. the fluorescent dots) and this is exactly something the present invention achieves to avoid. Therefore, the present invention proposes to segment the image first and suppress only the background signal. Furthermore, it is noted that measuring the background signal is more accurate in case only the background is selected.

In the fourth step, enhancement techniques (e.g. boosting, peaking) are applied to the area of interest.

Figure 10:
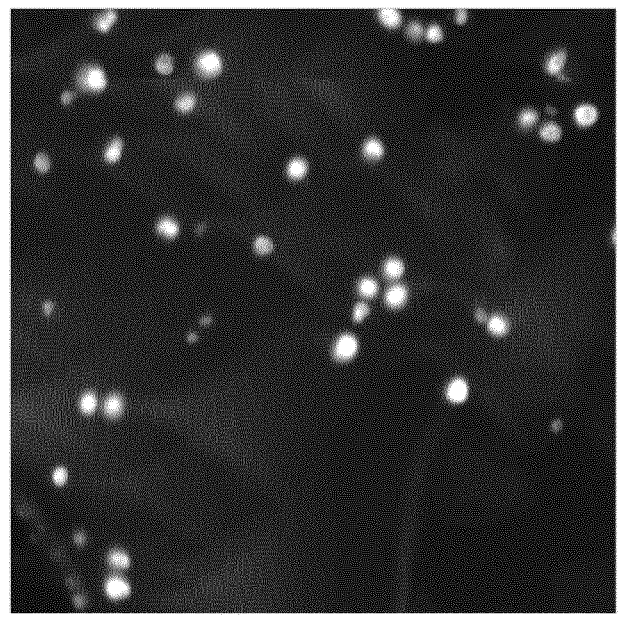
FIG. 10 shows schematically and exemplarily the effect of background suppression and local enhancement after image segmentation in accordance with an embodiment of the present invention, and FIGS. 11A and 11B respectively show schematically and exemplarily the effect of local enhancement only and background suppression only.
Figure 11A:
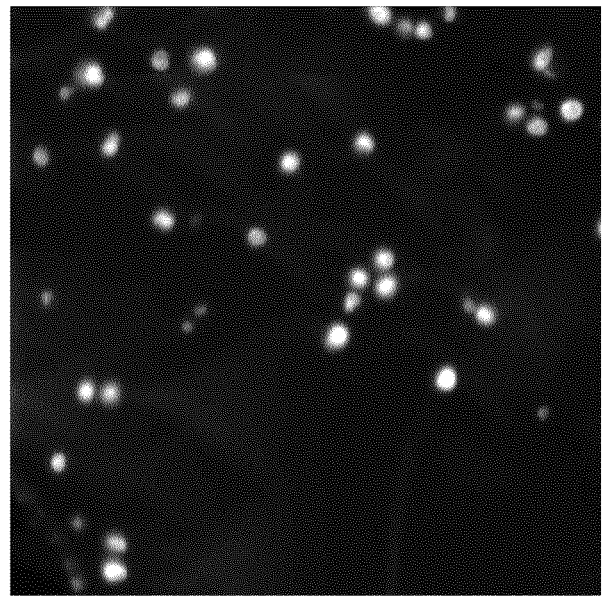
Figure 11B:
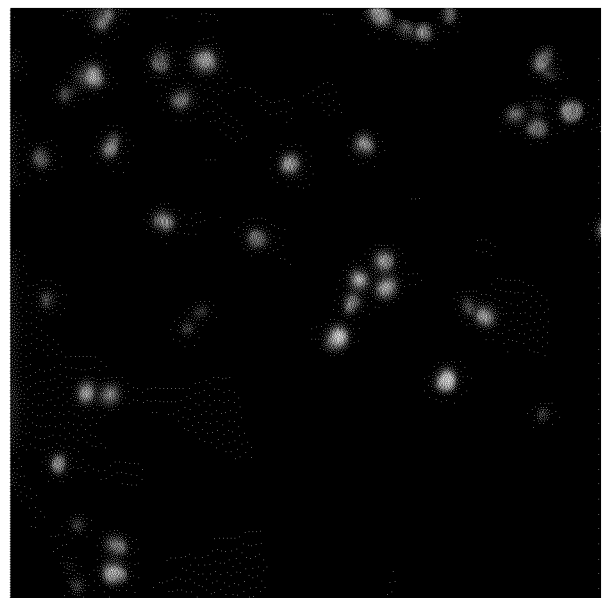

FIG. 10 shows an example of the output according to a preferred embodiment of the present invention. In particular, FIG. 10 shows the combined effect of background reduction and area-of-interest enhancing. As can be seen, the background signal is reduced, while the contrast is improved. Furthermore, the fine details of the relevant areas are still preserved and even enhanced. The background signal is determined using a smoothed histogram. By that, the method is robust to some local background fluctuations. Referring to FIGS. 11A and 11B, the advantage of using background reduction and area-of-interest enhancing in combination is demonstrated. Namely, FIG. 11A shows an example of the output according to an embodiment where only area-of-interest enhancing but no background reduction is applied, whereas FIG. 11B shows an example of the output according to an embodiment where only background reduction but no area-of-interest enhancing is applied.

An example application of the invention is in molecular pathology and digital pathology.

Although in the above described embodiments, the fluorescence image processing apparatus comprises the background determination unit and the background reduction unit coupled in parallel to the image enhancement unit, these embodiments are preferred embodiments only and in another embodiment the background determination unit, the background reduction unit, and the image enhancement unit may be coupled in series.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like background determination et cetera performed by one or several units or devices can be performed by any other number of units or devices. For example, the determination of the background signal in the fluorescence image can be performed by a single unit of by any other number of different units. The determinations and/or the control of the fluorescence image processing apparatus in accordance with the above described fluorescence image processing method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The present invention relates to a fluorescence image processing apparatus for enhancing a fluorescence image. The fluorescence image processing apparatus comprises an image segmentation unit, a background determination unit, a background reduction unit, and an image enhancement unit. It is porposed to first segment the background and the area of interest of a glass slide and to use this segmentation to enhance the contrast between both. By that, scanning and staining time can be reduced, while after enhancement the image data has still a comfortable contrast for the human operator.

The invention claimed is:

1. An apparatus for enhancing a fluorescence image, comprising:
   an image segmentation unit adapted to segment the fluorescence image into one or more areas of interest and one or more background areas;
   a background determination unit adapted to measure a background signal in the fluorescence image;
   a background reduction unit adapted to reduce the background signal in the one or more background areas, but not in the one or more areas of interest, in response to the measurement of the background signal; and
   an image enhancement unit adapted to receive the background signal to control enhancement of the one or more areas of interest, but not the one or more background areas.

2. The apparatus according to claim 1, further comprising:
   an input adapted for receiving the fluorescence image; and
   an output adapted for outputting an enhanced fluorescence image.

3. The apparatus according to claim 1, further comprising an image storing unit adapted for storing the fluorescence image.

4. The apparatus according to claim 1, further comprising a background storing unit adapted for storing the measured background signal.

5. The apparatus according to claim 1, further comprising a transmit unit for transmitting the enhanced fluorescence image to a display unit.

6. The apparatus according to claim 1, further comprising a receive unit for receiving an acquired fluorescence image from a fluorescence microscope.

7. The apparatus according to claim 1, wherein the image segmentation unit is adapted to segment the fluorescence image by applying at least one of dynamic thresholding and by applying a local histogram-based method.

8. The apparatus according to claim 1, wherein the background determination unit is adapted to create a smooth histogram from the fluorescence image.

9. The apparatus according to claim 1, wherein the background reduction unit is adapted to reduce the background signal by at least one of smoothing the one or more background areas and clipping the one or more background areas.

10. The apparatus according to claim 1, wherein the image enhancement unit is adapted to enhance by at least one of boosting the one or more areas of interest and peaking the one or more areas of interest.

11. The apparatus according to claim 1, further comprising:
    a fluorescence microscope adapted for acquiring the fluorescence image; and
    a apparatus for enhancing the fluorescence image
    a display unit for displaying an enhanced fluorescence image having reduced background areas and enhanced areas of interest.

12. A method for enhancing a fluorescence image, comprising acts of:
    segmenting the fluorescence image into one or more areas of interest and one or more background areas;
    measuring a background signal in the fluorescence image;
    reducing the background signal in the one or more background areas, but not in the one or more areas of interest, in response to the measurement of the background signal; and
    enhancing the one or more areas of interest, but not the one or more background areas,
    wherein the enhancing act is controlled by the background signal.

13. The method of claim 12, further comprising acts of:
    acquiring the fluorescence image; and
    displaying an enhanced fluorescence image having reduced back round areas and enhanced areas of interest.

14. A non-transitory computer readable medium comprising computer instructions which, when executed by a processor, configure the processor to perform a method for enhancing a fluorescence image, the method comprising acts of:
    segmenting the fluorescence image into one or more areas of interest and one or more background areas;
    measuring a background signal in the fluorescence image;
    reducing the background signal in the one or more background areas, but not in the one or more areas of interest, in response to the measurement of the background signal; and
    enhancing the one or more areas of interest, but not the one or more background areas,
    wherein the enhancing act is controlled by the background signal.

15. The non-transitory computer readable medium of claim 14, further comprising computer additional instructions which, when executed by a processor, configure the processor to cause:
    acquiring the fluorescence image; and
    displaying the enhanced fluorescence image.

* * * * *